(12) United States Patent
Croak et al.

(10) Patent No.: US 8,954,352 B1
(45) Date of Patent: Feb. 10, 2015

(54) METHOD AND APPARATUS FOR PROVISIONING FINANCIAL DATA

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1156 days.

(21) Appl. No.: 11/260,973

(22) Filed: Oct. 28, 2005

(51) Int. Cl.
*G06Q 40/00* (2012.01)

(52) U.S. Cl.
CPC .................................. *G06Q 40/00* (2013.01)
USPC .................... 705/35; 705/42; 705/70; 726/26

(58) Field of Classification Search
None
See application file for complete search history.

(56) References Cited

U.S. PATENT DOCUMENTS

| | | | |
|---|---|---|---|
| 7,013,365 B2 | 3/2006 | Arnouse | |
| 2001/0041991 A1 | 11/2001 | Segal et al. | |
| 2001/0051881 A1 | 12/2001 | Filler | |
| 2002/0010679 A1 | 1/2002 | Felsher | |
| 2002/0040305 A1 | 4/2002 | Nakatsuchi et al. | |
| 2002/0099568 A1 | 7/2002 | Turner et al. | |
| 2002/0199208 A1* | 12/2002 | Chang et al. | 725/131 |
| 2003/0050802 A1 | 3/2003 | Jay et al. | |
| 2003/0130866 A1 | 7/2003 | Turner et al. | |
| 2003/0158754 A1 | 8/2003 | Elkind | |
| 2003/0204460 A1* | 10/2003 | Robinson et al. | 705/35 |
| 2004/0078271 A1* | 4/2004 | Morano et al. | 705/19 |
| 2004/0257608 A1 | 12/2004 | Tipirneni | |
| 2005/0080718 A1* | 4/2005 | Desai | 705/38 |
| 2005/0086074 A1 | 4/2005 | Punzak et al. | |
| 2005/0159984 A1 | 7/2005 | Hirano et al. | |
| 2006/0031094 A1 | 2/2006 | Cohen et al. | |
| 2006/0227762 A1* | 10/2006 | Croak et al. | 370/352 |
| 2007/0016450 A1 | 1/2007 | Bhora et al. | |
| 2007/0016454 A1 | 1/2007 | Tipirneni | |
| 2007/0040889 A1 | 2/2007 | Sahashi | |
| 2007/0061170 A1 | 3/2007 | Lorsch | |
| 2008/0059233 A1 | 3/2008 | Tipirneni | |
| 2011/0145352 A1 | 6/2011 | Malik | |

OTHER PUBLICATIONS

White, Ron, "How Computers Work," Millenium Ed., Que Corporation, Indianapolis, IN, 1999.
Kurose, James F., et al., "Computer Networking: A Top-Down Approach Featuring the Internet," $3^{rd}$ Edition, Pearson Education, 2004, Front matter and pp. 1-5 included.
Lubow, Arthur, "Inspiration: Where does it come from?" The New York Times. Nov. 30, 2003. Available at http://www.nytimes.com/2003/11/30/magazine/inspiration-where-does-it-come-from.html?scp=213&sq=upmarket&st=nyt&pagewanted=print.
Gralla, Preson, "How the Internet Works, $6^{th}$ edition," Que Publishing, 2002.
EarthLink promises quicker dial-up; NetworkWorld.com, Mar. 31, 2003, Available from: <http://www.networkworld.com/newsletters/isp/2003/0331isp1.html>.
"Dialup over VoIP?," forum posting to http://forums.whirlpool.net.au, Jul. 13, 2005.

* cited by examiner

*Primary Examiner* — Tsan-Yu J Huang

(57) ABSTRACT

A method and apparatus for storing financial data utilizing a communications network is described. In one embodiment, provisioning access is provided to a plurality of unrelated financial entities. The financial data received from the plurality of unrelated financial entities are stored in a secure data store, e.g., a secure network based mailbox.

20 Claims, 4 Drawing Sheets

METHOD AND APPARATUS FOR PROVISIONING FINANCIAL DATA

BACKGROUND OF THE INVENTION

1. Field of the Invention

Embodiments of the present invention generally relate to telecommunications systems and, more particularly, to a method and apparatus for provisioning financial data in a communications network, such as a packet network, e.g., a voice over internet protocol (VoIP) network.

2. Description of the Related Art

Annually, taxpayers in the United States receive an influx of tax statements and other financial related materials from banks, investment firms, and employers that are needed to prepare tax filings. These statements and materials are typically sent via conventional "paper" mail and arrive throughout the early months of the year. It is normally the taxpayer's responsibility to collect the statements and retain them for when tax filings are due a few months later. However, these paper documents are occasionally misplaced or lost, thus creating problems for the taxpayer.

SUMMARY OF THE INVENTION

In one embodiment, a method and apparatus for storing financial data utilizing a communications network is described. More specifically, provisioning access is provided to a plurality of unrelated financial entities. The financial data received from the plurality of unrelated financial entities are stored in a secure data store, e.g., a secure network based mailbox.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
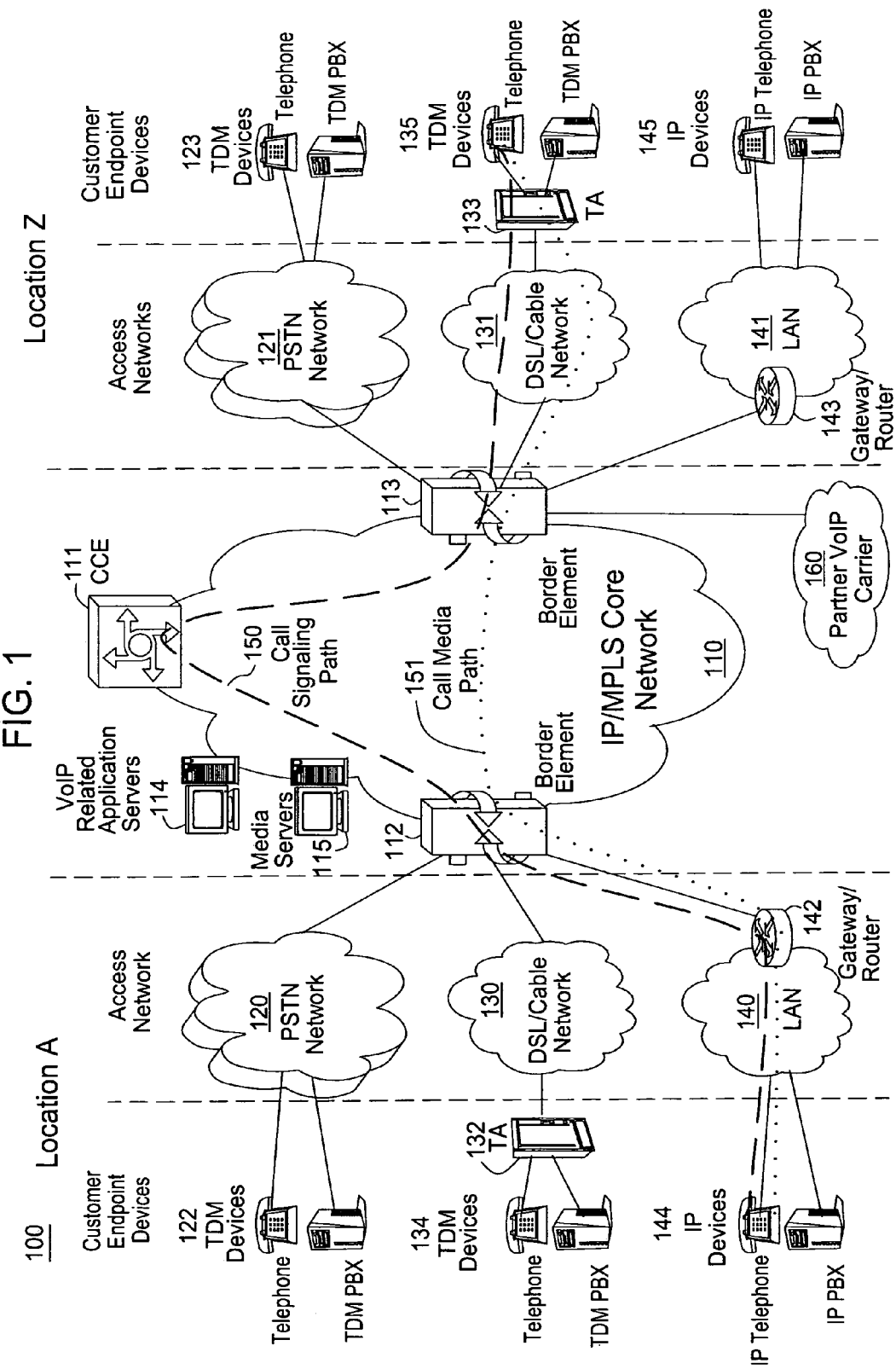
FIG. 1 is a block diagram depicting an exemplary embodiment of a communication system in accordance with the invention.

To better understand the present invention, FIG. 1 illustrates communication architecture 100 comprising an example network, e.g., a packet network such as a Voice over Internet Protocol (VoIP) network, related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Servers (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

One embodiment of the present invention enables a network service provider to provide registered customers with a secure network based data store (e.g., an electronic storage "box") that is explicitly designed to receive and store financially related information, e.g., electronic W-2 forms. Financial institutions providing information to these data stores must utilize a special authorization key to gain the necessary access to supply the data. Similarly, a registered customer must use a unique user authorization key to obtain the financial data. Thus, only authorized and authenticated senders and recipients may be granted access to the data stores.

Figure 2:
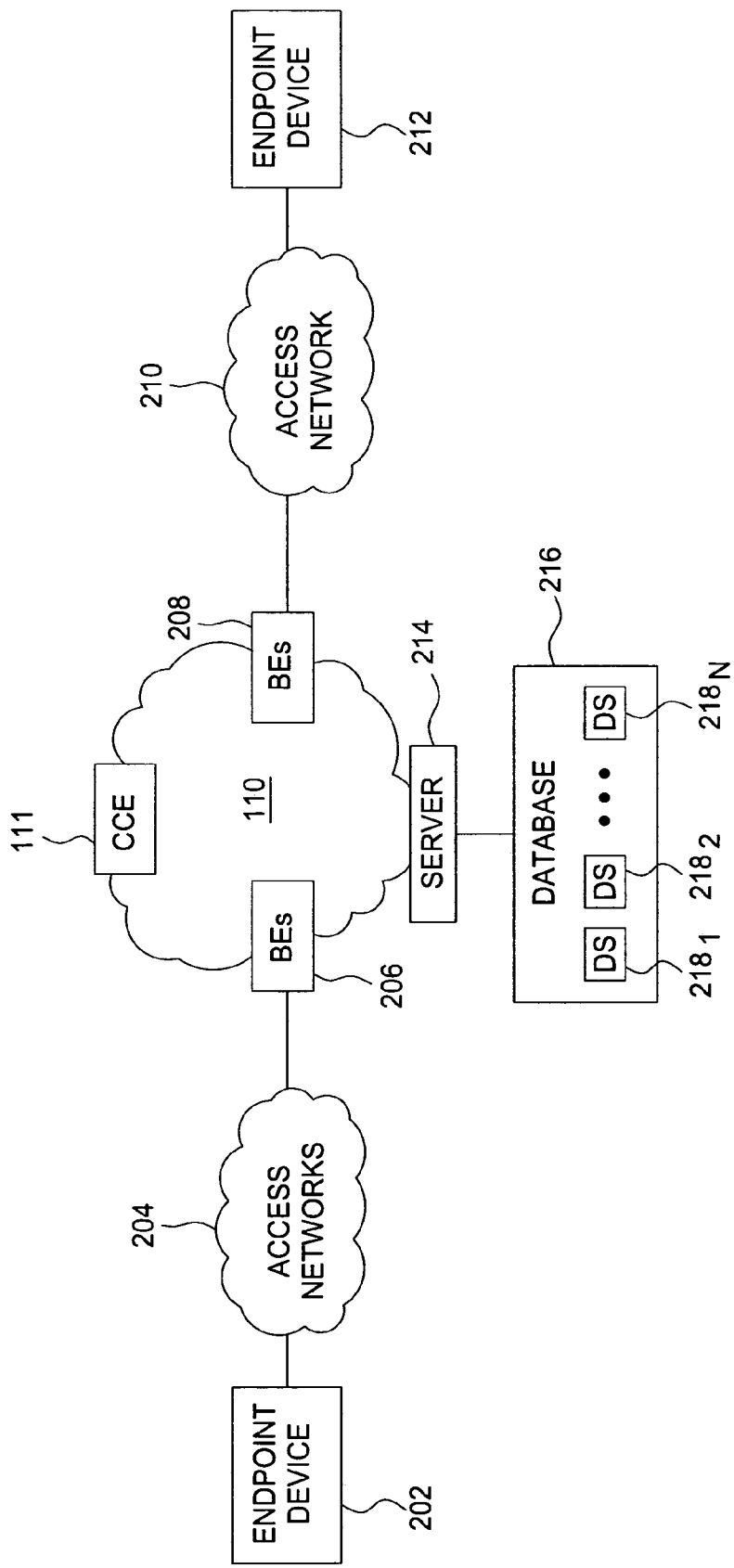
FIG. 2 is a block diagram depicting an exemplary configuration of the communication system of FIG. 1 constructed in accordance with one or more aspects of the invention.

FIG. 2 is a block diagram depicting an exemplary configuration of the communication system of FIG. 1 constructed in accordance with one or more aspects of the invention. An endpoint device 202 is configured for communication with the core network 110 via an access network 204 and one or more border elements (BEs) 206. An endpoint device 212 is configured for communication with the core network 110 via an access network 210 and one or more BEs 208. The endpoint device 202 and the endpoint device 212 may comprise any of the customer endpoint devices described above (e.g., TDM devices, IP devices, etc.). The access networks 204 and 210 may comprise any of the access networks detailed above (e.g., PSTN, DSL/Cable, LAN, etc.).

The core network 110 further includes a server 214 in communication with a database 216. In one embodiment of the present invention, the server 214 comprises a dedicated application server that is configured to provide provisioning access to separate and unrelated financial entities (e.g., banks, credit unions, investment firms, employers and the like, which are not subsidiaries of each other or divisions in the same corporation or company) to a secure data store. Likewise, the server 214 is also responsible for storing the financial data provided by financial entities into the database 216. The server 214 may also be configured to provide a registered customer the access needed to retrieve the financial data provisioned by the financial entities. The database 216 may be any type of electronic collection of data that is well known in the art. In one embodiment, the database 216 may contain a plurality of secure data stores $218_{1 \ldots n}$, wherein each data store 218 is associated with a different registered customer.

In one embodiment, the server 214 (or plurality of like servers) is configured to support a multitude of secured data stores $218_{1 \ldots n}$ for a respective number of registered customers of the service provider. Notably, these data stores $218_{1 \ldots n}$ may be stored in a database 216, a disk storage volume, or in some other storage medium. Once registered and provided with a secure data store 218 by the service provider, the customer notifies a variety of financial entities, such as a bank, credit union, employer, and/or investment firm, and provides them with a unique authorization key. It is important to note that each of these financial entities is often completely unrelated and independent from the other remaining financial institutions (e.g., no subsidiaries of each other, no divisions of the same corporation, etc.). Once a financial entity is equipped with an authorization key by the customer, the financial entity is able to obtain provisioning access (e.g., can only provide or upload data to the data store) to the customer's data store 218 via server 214.

More specifically, a financial entity submits the authorization key, which may be a login id and/or password, to the server 214 and obtains the requisite access to upload financial data. The financial data, which may include tax related information (e.g., electronic W-2 data), is then routed and stored by the server 214 in the data store 218 that corresponds to the intended registered customer. Because the authorization code utilized by the financial entity is associated with a particular registered customer, the server 214 knows which data store 218 the financial data should be stored in. The server 214 also receives data from the other unrelated financial entities in a similar manner. Therefore, the customer will ultimately have a data store that contains financial data (e.g., W-2 and other tax filing documents) provided by a plurality of different and unrelated financial institutions. In one embodiment, the server 214 notifies the customer after storing information into the customer's data store 218. Namely, the server 214 will send a notification alarm, such as an email, a voice message and the like, to alert the customer that the data store 218 has been provisioned with new financial data.

At any time after the data store 218 is issued by the service provider, the customer may use the user authorization key to access the server 214 to arbitrarily check the contents of the data store 218. For example, this may be done before steps 304 or 306 (although data may not yet be contained in the data store) have occurred. In one embodiment, a customer may access a web page or web site supported by server 214 and provide the authorization key via a user interface. Once the authorization key is provided, the customer is granted retrieval access and may acquire any financial data that is contained in the data store 218. Notably, the customer may obtain (e.g., download) all of a portion of the financial data contained in the data store. In one embodiment, the customer may also have provisioning access in addition to retrieval access. Normally, a customer does not need to upload any data to the data store 218, but various situations may arise, e.g., if the registered customer is an independent contractor and must provision the data store 218 with financial data.

Figure 3:
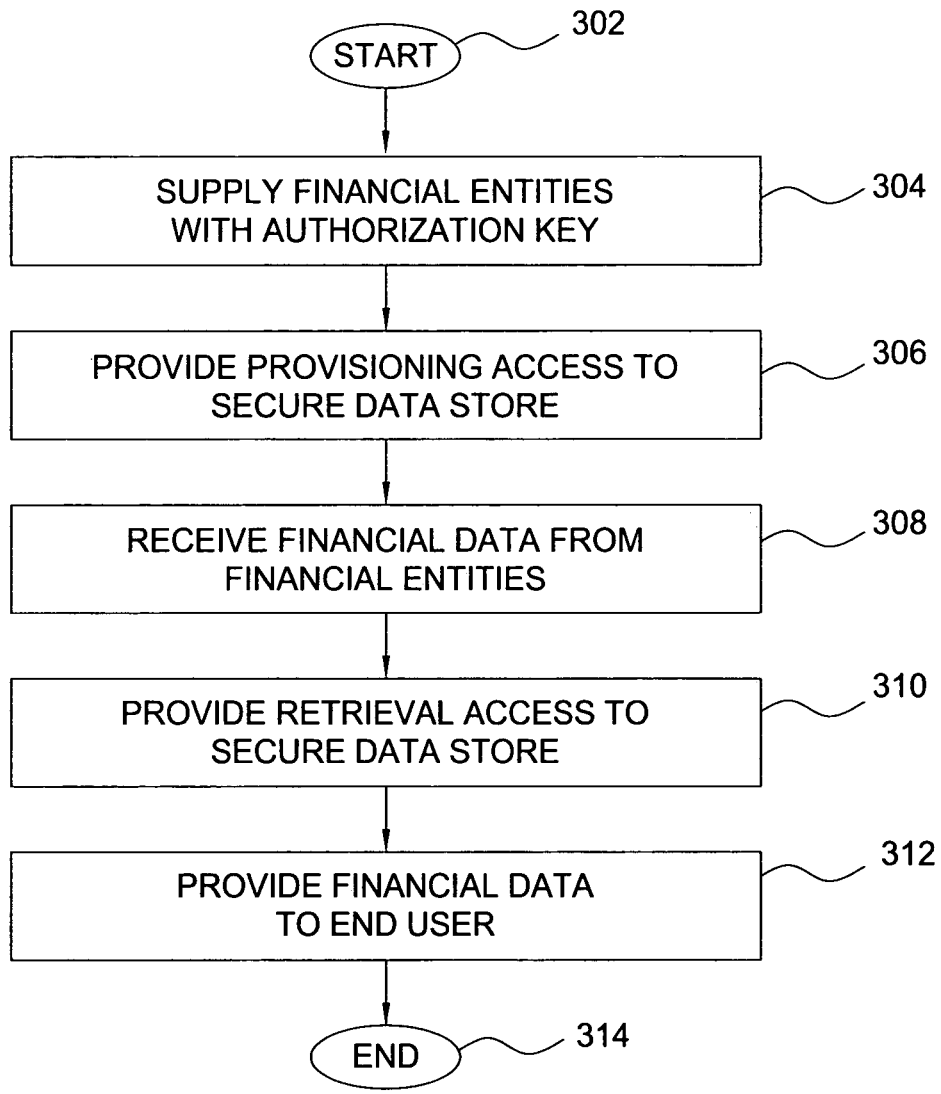
FIG. 3 is a flow diagram depicting an exemplary embodiment of a method for provisioning financial data in accordance with one or more aspects of the invention.

FIG. 3 is a flow diagram depicting an exemplary embodiment of a method 300 for provisioning financial data in a communications network as related to one or more aspects of the invention. The method 300 begins at step 302 and proceeds to step 304 where financial entities are supplied with an authorization key. In one embodiment, the end-user customer provides the appropriate financial organizations (e.g., the end-user's bank, credit union, investment firm, employer, etc.) with the proper authorization to access the customer's secure financial data store for provisioning purposes. This authorization key may comprise a login identification, a password, or some other like mechanism that is well known in the art.

At step 306, provisioning access to a secure financial data store is provided. In one embodiment, a server 214 grants uploading access to a financial entity with the proper authorization key. For example, the end-user's investment firm may use a login id and password provided by the customer to access the secure data store. The authorization key may be entered via a web portal supported by server 214.

At step 308, financial data is uploaded to the secure data store 218. In one embodiment, the financial entity uploads the financial data, such as the customer's tax information, to the secure data store only after obtaining the requisite provisioning access from the server 214. Specifically, the tax information is received by the server 214 and is subsequently stored in the appropriate data store 218 contained in the database 216.

At step 310, retrieval access to the secure data store is provided. In one embodiment, the customer utilizes a user authorization key to obtain retrieval access to the secure data store via the server 214. Although step 310 is depicted to follow steps 306 and 308, those skilled in the art realize that step 310 may precede the previous two steps without any deviation from the nature of the present invention.

At step 312, the financial data is provided to the end-user customer. In one embodiment, the customer may obtain, e.g., download, at least a portion (or all) of the contents in the data store 218 via the server 214. The method 300 then ends at step 314.

Figure 4:
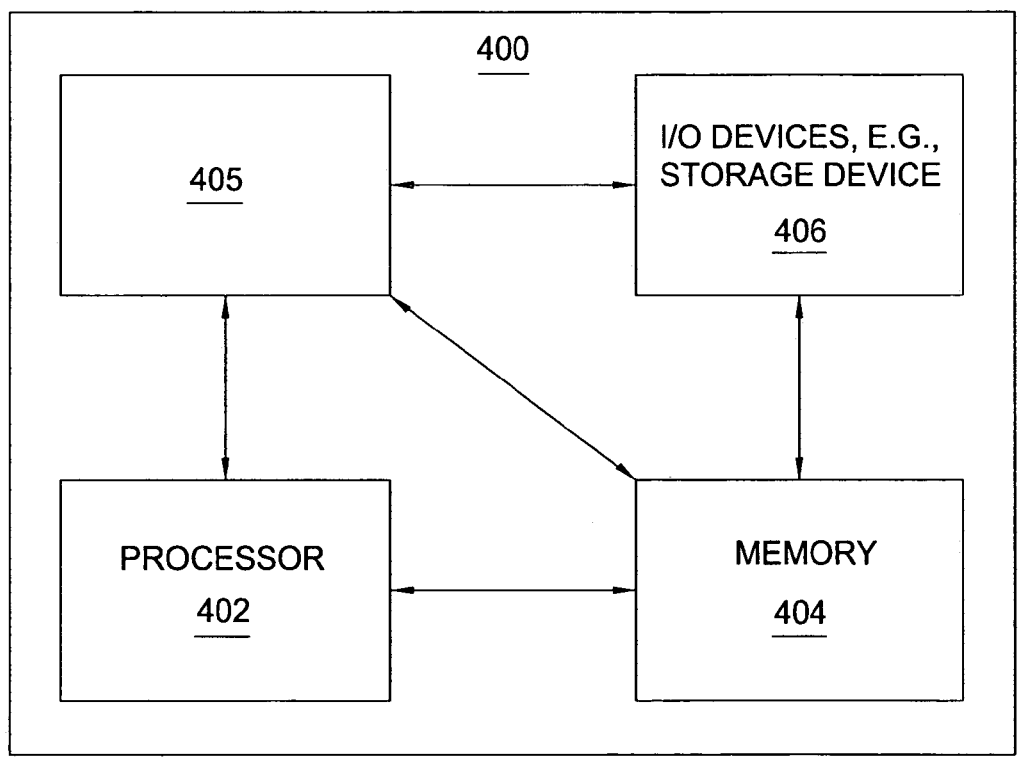
FIG. 4 is a block diagram depicting an exemplary embodiment of a computer suitable for implementing the processes and methods described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for provisioning financial data, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASICs), a general purpose computer or any other hardware equivalents. In one embodiment, the present module or process 405 for provisioning financial data can be loaded into memory 404 and executed by processor 402 to implement the functions as discussed above. As such, the present process 405 for provisioning financial data (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for storing financial data records in a communications network, comprising:
   receiving, by a processor deployed in the communications network, the financial data records from a plurality of unrelated financial entities, wherein each of the financial data records comprises tax data of a registered customer of the communications network;
   receiving, by the processor, a provisioning authorization key from each of the plurality of unrelated financial entities for providing a provisioning access to a secure data store located in the communications network, wherein the provisioning access comprises an authorization to upload a financial data record to the secure data store;
   providing, by the processor, the provisioning access to each the plurality of unrelated financial entities upon the receiving of the provisioning authorization key from each of the plurality of unrelated financial entities, wherein the provisioning authorization key was previously received by each of the plurality of unrelated financial entities from the registered customer; and
   storing, by the processor, the financial data records received from the plurality of unrelated financial entities in the secure data store for each of the plurality of unrelated financial entities that presents the provisioning authorization key.

2. The method of claim 1, wherein the communications network comprises an internet protocol network.

3. The method of claim 2, wherein the internet protocol network comprises a service over internet protocol network.

4. The method of claim 1, further comprising:
   providing a retrieval access upon a receipt of a proper authorization key; and
   providing one of the financial data records stored in the secure data store.

5. The method of claim 1, wherein one of the plurality of unrelated financial entities comprises a bank.

6. The method of claim 1, wherein the authorization key comprises at least one of: a login identification or a password.

7. An apparatus for storing financial data utilizing records in a communications network, the apparatus comprising:

a processor; and a computer-readable medium storing instructions which, when executed by the processor, cause the processor to perform operations, the operations comprising:

receiving the financial data records from a plurality of unrelated financial entities, wherein each of the financial data records comprises tax data of a registered customer of the communications network;

receiving a provisioning authorization key from each of the plurality of unrelated financial entities for providing a provisioning access to a secure data store located in the communications network, wherein the provisioning access comprises an authorization to upload a financial data record to the secure data store;

providing the provisioning access to each of the plurality of unrelated financial entities upon the receiving of the provisioning authorization key from each of the plurality of unrelated financial entities, wherein the provisioning authorization key was previously received by each of the plurality of unrelated financial entities from the registered customer; and storing the financial data records received from the plurality of unrelated financial entities in the secure data store for each of the plurality of unrelated financial entities that presents the provisioning authorization key.

8. The apparatus of claim 7, wherein the communications network comprises an internet protocol network.

9. The apparatus of claim 7, wherein the operations further comprise:

providing a retrieval access upon a receipt of a proper authorization key; and providing one of the financial data records stored in the secure data store.

10. A non-transitory computer-readable medium storing instructions which, when executed by a processor deployed in a communications network, cause the processor to perform operations for storing financial data records in the communications network, the operations comprising:

receiving the financial data records from a plurality of unrelated financial entities, wherein each of the financial data records comprises tax data of a registered customer of the communications network;

receiving a provisioning authorization key from each of the plurality of unrelated financial entities for providing a provisioning access to a secure data store located in the communications network, wherein the provisioning access comprises an authorization to upload a financial data record to the secure data store;

providing the provisioning access to each of the plurality of unrelated financial entities upon a receipt of the provisioning authorization key from each of the plurality of unrelated financial entities, wherein the provisioning authorization key was previously received by each of the plurality of unrelated financial entities from the registered customer; and storing the financial data records received from the plurality of unrelated financial entities in the secure data store for each of the plurality of unrelated financial entities that presents the provisioning authorization key.

11. The non-transitory computer readable medium of claim 10, wherein the communications network comprises an internet protocol network.

12. The non-transitory computer readable medium of claim 11, wherein the internet protocol network comprises a service over internet protocol network.

13. The non-transitory computer readable medium of claim 10, wherein the operations further comprise:

providing a retrieval access upon a receipt of a proper authorization key; and providing one of the financial data records stored in the secure data store.

14. The non-transitory computer readable medium of claim 10, wherein one of the plurality of unrelated financial entities comprises a bank.

15. The non-transitory computer readable medium of claim 10, wherein the authorization key comprises a password.

16. The method of claim 1, wherein one of the plurality of unrelated financial entities comprises an employer.

17. The method of claim 1, wherein one of the plurality of unrelated financial entities comprises an investment firm.

18. The apparatus of claim 7, wherein one of the plurality of unrelated financial entities comprises an employer.

19. The apparatus of claim 7, wherein one of the plurality of unrelated financial entities comprises an investment firm.

20. The non-transitory computer readable medium of claim 10, wherein one of the plurality of unrelated financial entities comprises an employer.

* * * * *